(12) United States Patent
Aizenberg et al.

(10) Patent No.: US 6,662,245 B1
(45) Date of Patent: Dec. 9, 2003

(54) APPARATUS AND SYSTEM FOR BLOCKING MEMORY ACCESS DURING DMA TRANSFER

(75) Inventors: Yair Aizenberg, Tustin, CA (US); Laurent Alloin, Monmouth Beach, NJ (US); Peter Kleewein, Eatontown, NJ (US); Yong Je Lim, Tinton Falls, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 302 days.

(21) Appl. No.: 09/912,993

(22) Filed: Jul. 25, 2001

Related U.S. Application Data

(60) Provisional application No. 60/220,885, filed on Jul. 26, 2000.

(51) Int. Cl.[7] .............................................. G06F 13/14
(52) U.S. Cl. ............................ 710/22; 710/26; 710/28
(58) Field of Search ................................. 710/22, 26, 28

(56) References Cited

U.S. PATENT DOCUMENTS

| 5,261,083 | A | * | 11/1993 | Witkowski et al. ......... 395/575 |
| 5,875,289 | A | * | 2/1999 | Woodruff et al. ........ 395/182.07 |
| 6,412,028 | B1 | * | 6/2002 | Steed et al. .................... 710/22 |
| 6,453,366 | B1 | * | 9/2002 | Broberg, III et al. ......... 710/26 |

* cited by examiner

Primary Examiner—Abdelmoniem Elamin
(74) Attorney, Agent, or Firm—Thomas, Kayden, Horstemeyer & Risley

(57) ABSTRACT

The present invention is directed to an apparatus and system for selectively inhibiting access to a memory during a DMA block transfer. In accordance with one embodiment of the present invention, the system includes memory, a DMA engine, and logic configured so that when a control signal is asserted, the logic blocks the DMA engine's request for access to memory and generates an acknowledgment of the request, such that the DMA engine performs a DMA transfer without accessing data in memory.

3 Claims, 3 Drawing Sheets

APPARATUS AND SYSTEM FOR BLOCKING MEMORY ACCESS DURING DMA TRANSFER

CLAIM OF PRIORITY

The present application claims the benefit of co-pending U.S. provisional patent application, issued Ser. No. 60/220,885, and filed Jul. 26, 2000, which is hereby incorporated by reference in its entirety.

FIELD OF THE INVENTION

The present invention generally relates to memory access in a computer system. More specifically, the invention relates to memory access during a DMA (Direct Memory Access) transfer.

BACKGROUND OF THE INVENTION

In many processor-based systems, it is advantageous to use specialized logic rather than the processor to move large amounts of data to and from memory, thus leaving the processor free to do other work. Such specialized logic units are known as DMA (Direct Memory Access) engines. A typical DMA engine is configured by the processor with a starting memory address, a transfer size, and direction (transfer to memory or transfer from memory), then given a "start transfer" signal. The engine then transfers an entire block of data to or from memory without further processor intervention. The engine may notify the processor with a "block complete" signal when the transfer is finished.

The engine typically uses a counter, initialized to the programmed transfer size, and a current address pointer, initialized to the starting memory address. The engine transfers one byte/word/dword to or from memory by generating the proper sequence of address, data and control signals (i.e. read or write) as required by memory. The address signals are generated from a current address register. The data signals may be generated by the engine, or may be generated externally and simply passed through by the engine.

After a byte/word/dword transfer, the engine advances the current address pointer and decrements the counter. If the counter is zero, the block transfer is finished and the block complete signal is given. If the counter is non-zero, the engine transfers the next byte/word/dword.

In some applications, especially data communications, the "block complete" signal provided by the DMA engine at the end of each block transfer is used by other logic units as a block-rate "clock" signal. Using DMA block complete as a block-rate clock is simpler than generating the clock from another source, such as the sampling clock. For this reason, it would be advantageous to keep the DMA engine transferring data at all times in order to make use of the block-rate clock.

However, in some data communications applications such as TDM (Time Division Multiplex), the data stream is not continuous, so that using the DMA engine to transfer data continuously would unnecessarily occupy memory and dissipate undue power. Thus, there is a need for an invention which allows continuous use of the DMA engine without unnecessarily occupying memory.

SUMMARY OF THE INVENTION

Certain objects, advantages, and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve various objects and advantages, the present invention is directed to an apparatus and system for blocking memory access during a DMA transfer. In accordance with one embodiment of the present invention, the system includes memory, a DMA engine, and logic configured so that when a control signal is asserted, the logic blocks the DMA engine's request for access to memory and generates an acknowledgment of the request, such that the DMA engine performs a DMA transfer without accessing data in memory.

One advantage of the present invention is that the DMA engine can be kept running continuously even when no data is available, so that the DMA engine's block complete output signal can be used by other parts of the system as a block-rate clock. Without this invention, continuous use of the DMA engine would unnecessarily occupy memory and dissipate undue power. Another advantage of the present invention is that it requires no modification to existing DMA engine designs.

Other objects, features and advantages of the present invention will become apparent to those skilled in the art upon examination of the following drawings and detailed description. It is intended that all such additional objects, features, and advantages be included herein within the scope of the present invention, as defined by the claims.

BRIEF DESCRIPTION OF THE DRAWINGS

The present invention will be more fully understood from the detailed description given below and from the accompanying drawings of a preferred embodiment of the invention, which however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION OF THE PREFERRED EMBODIMENTS

Figure 1:
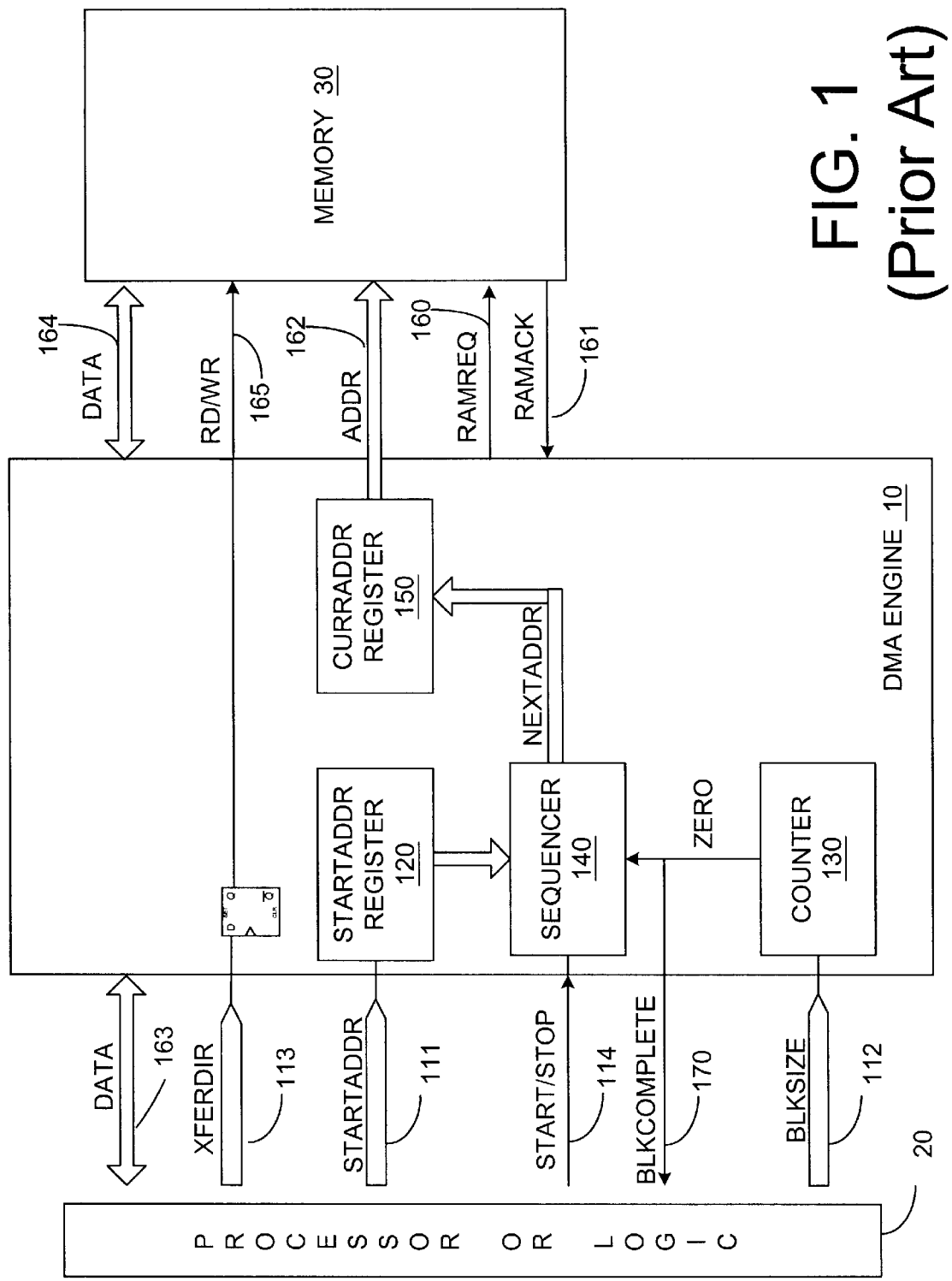
FIG. 1 is a block diagram of a DMA engine as known in the prior art.

Having summarized the invention above, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims. Indeed, the present invention is believed to be applicable to a variety of systems, devices, and technologies.

Turning now to the drawings, wherein like reference numerals designate corresponding parts throughout the drawings, FIG. 1 illustrates a DMA engine as known in the prior art. To initialize the DMA engine 10, the microprocessor or other logic 20 (e.g. state machine) programs a StartAddress 111, BlockSize 112 and TransferDirection 113 of the DMA engine 10. After initialization, the microprocessor or other logic 20 asserts signal Start-Stop 114 to start a continuous transfer of blocks of size BlockSize 112.

DMA engine 10 stores the start address in StartAddress register 120, and initializes counter 130 with BlockSize. When Start-Stop 114 is asserted, sequencer 140 moves the contents of StartAddress register 120 to CurrentAddress register 150. To transfer the first datum, DMA engine 10 requests access to memory 30 by asserting Req 160 and waiting for Ack 161 to be asserted. At that time, CurrentAddress register 150 is output to memory 30 as Address 162, input Data 163 is passed through to output Data 164, and TransferDirection 113 is used to drive output Read-Write 165, thus transferring an element of data to or from memory 30. Then counter 130 is decremented, sequencer 140 increments the address and updates CurrentAddress register 150, and the sequence begins again to transfer the next datum. When counter 130 reaches zero, output Block-Complete 170 is asserted, and counter 130 signals sequencer 140 to reset the address from StartAddress register 120, thus beginning another block-sized transfer using the original StartAddress 111.

The operation of the DMA circuitry of FIG. 1, and the signaling of the memory 30 will be understood by persons skilled in the art. For this reason, the operation has been only summarily described above.

Figure 2:
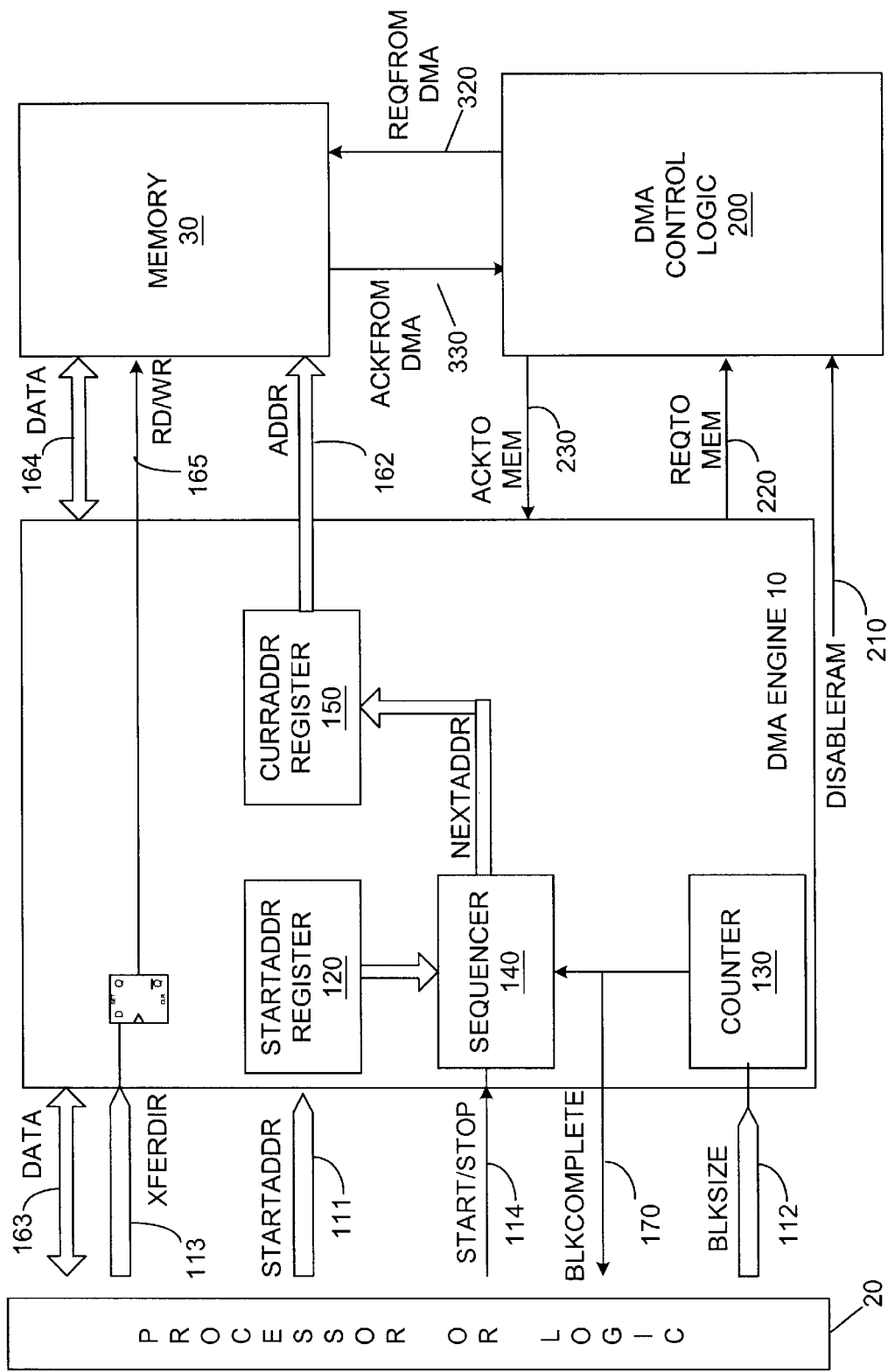
FIG. 2 is a block diagram of an apparatus for blocking memory access during a DMA transfer, in accordance with the present invention.

Reference is now made to FIG. 2, which is a block diagram of an apparatus for blocking memory access during a DMA transfer, in accordance with the present invention. DMA engine 10, memory 30, and the signals coupled to the memory 30 operate in the same manner as the illustrative prior art system of FIG. 1. In accordance with the present invention, however, additional circuitry, illustrated in FIG. 2 as DMA control logic 200, is added. This circuitry operates to inhibit memory reads and writes during a DMA transfer by altering the handshake signals between DMA engine 10 and memory 30 under the control of signal DisableRam 210. Signal DisableRam 210 can be supplied by the same microprocessor or logic 20 which programs DMA engine 10, or by independent logic. Signal DisableRam 210 is asserted to inhibit memory reads and writes during a DMA transfer, and deasserted to allow memory reads and writes to occur normally.

The handshake signaling between DMA engine 10 and memory 30 works as follows. Before transferring a datum to or from memory 30, DMA engine 10 first requests access to memory 30 by asserting ReqFromDma signal 220. In the prior art (FIG.1), this request signal was connected directly to memory 30, but in one embodiment of the present invention, this signal is connected instead to DMA control logic 200, which acts to block this signal from reaching memory 30 when DisableRam signal 210 is asserted. The handshake is complete when DMA engine 10 sees its input AckToDma signal 230 asserted. The DMA engine 10 completes the operation by updating CurrentAddress register 150 and counter 120, but no data transfer takes place. In the prior art (FIG. 1), this acknowledge signal from DMA engine 10 was connected directly to memory 30, but in one embodiment of the present invention, it is connected instead to DMA control logic 200. Since the request from DMA engine 10 is blocked from reaching memory 30 when DisableRam signal 210 is asserted, memory 30 will not generate its AckFromMem signal 330. DMA control logic 200 therefore generates a fake acknowledgement AckToDma signal 230 which is input to DMA engine 10.

When DisableRam signal 210 is not asserted, the DMA control logic operates to pass through, unaltered, the request and acknowledge signals between DMA engine 10 and memory 30, so that memory reads and writes do occur during a DMA transfer. In this mode of operation, ReqToMem signal 320 (input to memory 30) follows ReqFromDma 220 (output from DMA engine 10), and AckToDma 230 (input to DMA engine 10) follows AckFromMem 330 (output from memory 30).

Figure 3:
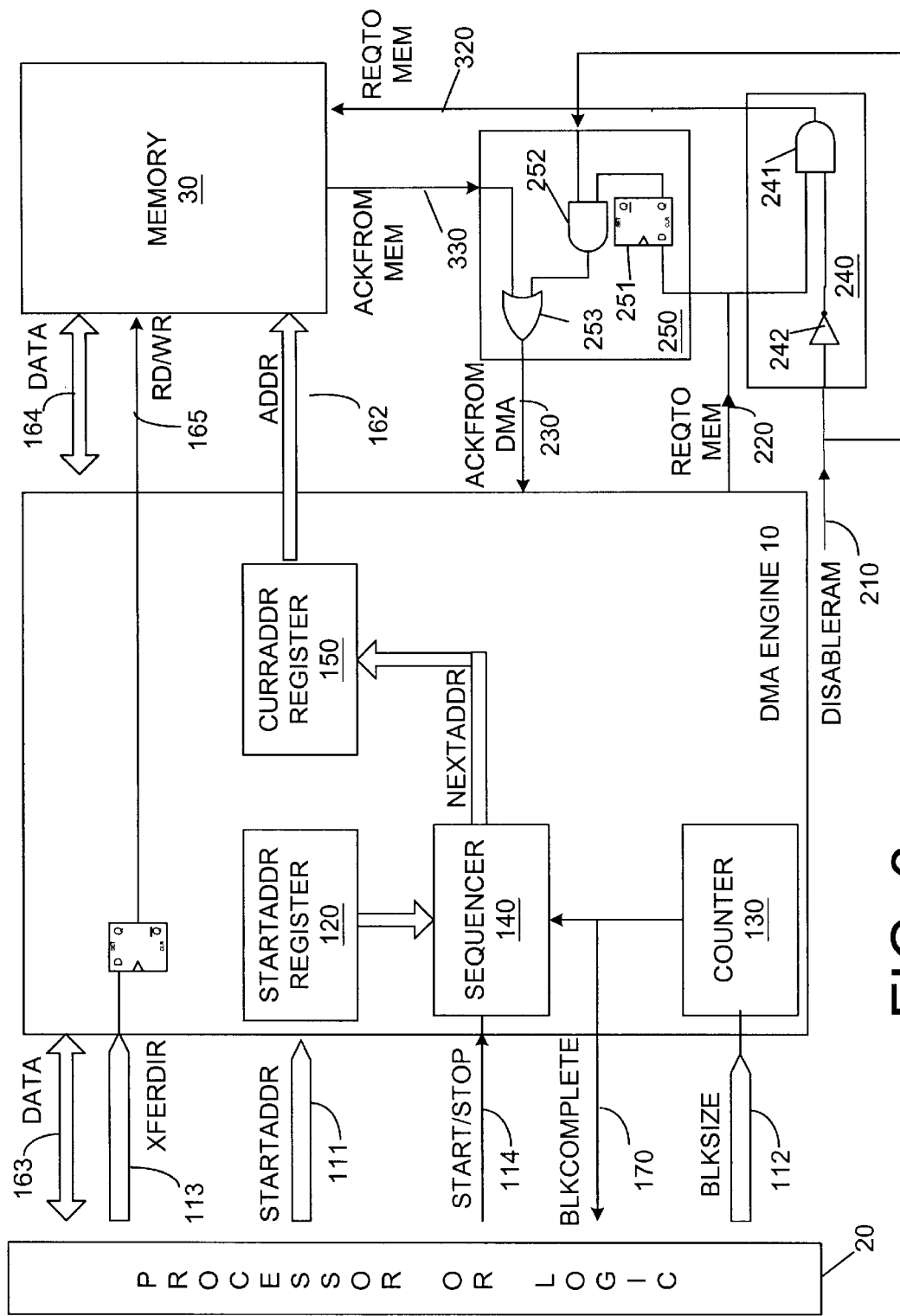
FIG. 3 is a block diagram similar to FIG. 2, but more particularly illustrating circuitry of DMA control logic, in accordance with an embodiment of the present invention

Having described the top-level functional operation of the invention, reference is now made to FIG. 3, which is a block diagram similar to FIG. 2, but illustrating a preferred implementation of the circuitry for the DMA control logic. Specifically, the DMA control logic 200 includes logic block 240 and logic block 250. Logic block 240 alters the request signal between DMA engine 10 and memory 30, while logic block 250 alters the acknowledgement signal between DMA engine 10 and memory 30.

Logic block 240 uses AND gate 241 in combination with inverter 242 to block ReqToMem 220 from reaching memory 30 when DisableRam signal 20 is asserted, while also allowing ReqToMem 220 to pass through unaltered when DisableRam signal 210 is deasserted. When DisableRam signal 210 is high (active), the output of AND gate 241 (which becomes ReqToMem 320) is low, even when DMA engine 10 asserts ReqToMem signal 220. Logic block 250 finishes the memory access handshake, as described below. While DMA engine 10 operates as usual to generate address, data and read-write signals for memory 30, no memory access will occur because memory 30 did not receive a request signal.

When DisableRam signal 210 is low (inactive), the output of AND gate 241 (which becomes ReqToMem 320) follows input ReqFromDma 220. Logic block 250 then finishes the memory access handshake, as described below. Then DMA engine 10 operates as usual to transfer data, and memory access will occur because memory 30 did receive a request signal when DMA engine 10 asserted ReqToMem 220.

Logic block 250 uses a combination of latch 251, AND gate 252, and OR gate 253 to generate AckToDma 230 when DisableRam signal 210 is asserted, after ReqToMem 220 has been asserted. Logic block 251 also allows AckFromMem 330 to pass through unaltered as AckToDma 230 when DisableRam signal 210 is deasserted.

In operation, when ReqFromDma 220 goes high, the signal is first latched in latch 251 then fed to AND gate 252, whose other input is DisableRam signal 210. When DisableRam signal 210 is high also, the output of AND gate 252 is high, and this passes through OR gate 253 to generate a high on AckToDma signal 230.

This signal is seen by DMA engine 10 as an acknowledgment of the memory access request, and DMA engine 10 generates address, data and read-write signals for memory 30. However, no memory access will occur because memory 30 did not receive a request signal.

Whenever DisableRam signal 210 is low (inactive), the output of AND gate 252 is low. Because this low output is an input to OR gate 253, the output of OR gate 253 follows its other input, which is AckFromMem signal 330. DMA engine 10 operates as usual when it sees this signal, and memory access will occur because memory 30 did receive a request signal.

It is emphasized that the above-described embodiments of the present invention, particularly any "preferred" embodiments, are merely possible examples of the implementations that are merely set forth for a clear understanding of the principles of the invention. It will be apparent to those skilled in the art that many modifications and variations may be made to the above-disclosed embodiments of the present invention without departing substantially from the spirit and principles of the invention. All such modifications and variations are intended to be included herein within the scope of the disclosure and present invention and protected by the following claims.

Therefore, having thus described the invention, at least the following is claimed:

1. An apparatus to block access to memory during a DMA transfer comprising:

a memory with a signal ReqToMem as input and a signal AckFromMem as output, where the memory grants request for access to memory by asserting the signal AckFromMem after the signal ReqToMem is asserted;

a DMA engine with a signal ReqFromDma as output, a signal AckToDma as input, and a signal BlockComplete as output, where the DMA engine requests access to memory by asserting the signal ReqFromDma and waits for the signal AckToDma to be asserted before accessing memory, and the DMA engine asserts BlockComplete after each block has been transferred;

a control signal DisableRam as input;

a first logic with the signal DisableRam as input, the signal ReqFromDma as input and the signal ReqToMem as output, configured to deassert the signal ReqToMem whenever the signal DisableRam is asserted, and to pass through the input signal ReqFromDma as the output signal ReqToMem whenever the signal DisableRam is deasserted; and a second logic with the signal DisableRam as input, the signal AckFromMem as input and the signal AckToDma as output, configured to pass through the input signal AckFromMem as output signal AckToDma whenever the signal DisableRam is deasserted, and to assert the signal AckToDma whenever:the signal DisableRam is asserted and the signal ReqFromDma is asserted.

2. The apparatus of claim 1, where the first logic comprises an inverter and an AND gate.

3. The apparatus of claim 1, where the second logic comprises a latch, an AND gate and an OR gate.

* * * * *